US009228759B2

(12) United States Patent
Ando

(10) Patent No.: US 9,228,759 B2
(45) Date of Patent: Jan. 5, 2016

(54) CIRCULATING-TYPE HOT-WATER SUPPLY DEVICE

(71) Applicant: RINNAI CORPORATION, Nagoya-shi, Aichi (JP)

(72) Inventor: Masakazu Ando, Nagoya (JP)

(73) Assignee: RINNAI CORPORATION, Nagoya-Shi (JP)

( * ) Notice: Subject to any disclaimer, the term of this patent is extended or adjusted under 35 U.S.C. 154(b) by 317 days.

(21) Appl. No.: 14/047,260

(22) Filed: Oct. 7, 2013

(65) Prior Publication Data
US 2015/0096504 A1 Apr. 9, 2015

(51) Int. Cl.
F24H 1/52 (2006.01)
F24H 9/20 (2006.01)
F24H 1/12 (2006.01)
G05B 23/02 (2006.01)
F24H 1/00 (2006.01)

(52) U.S. Cl.
CPC .............. *F24H 9/2035* (2013.01); *F24H 1/124* (2013.01); *G05B 23/0205* (2013.01); *F24H 1/0036* (2013.01)

(58) Field of Classification Search
CPC ................ F24D 3/08; F24H 1/52; F24H 1/18
USPC ................ 122/15.1, 18.1, 14.2, 14.22, 406.1; 237/12, 19, 56, 57, 62
See application file for complete search history.

(56) References Cited

U.S. PATENT DOCUMENTS

| 7,597,066 | B2 * | 10/2009 | Shimada | F24H 9/2035 122/14.22 |
| 7,628,123 | B2 * | 12/2009 | Inami | F24D 12/02 122/448.3 |
| 8,267,051 | B2 * | 9/2012 | Ando | F23N 3/065 122/14.31 |
| 8,695,539 | B2 * | 4/2014 | Iwama | F24H 1/145 122/18.1 |
| 2003/0131804 | A1 * | 7/2003 | Iwama | F24H 9/2035 122/18.1 |
| 2012/0090341 | A1 * | 4/2012 | Hatada | F25B 27/00 62/238.7 |

FOREIGN PATENT DOCUMENTS

JP 2005-003224 1/2005
JP 2007-263403 10/2007

OTHER PUBLICATIONS

Japanese Office Action dated Feb. 17, 2015, 2 pages.

* cited by examiner

*Primary Examiner* — Gregory A Wilson
(74) *Attorney, Agent, or Firm* — Rankin, Hill & Clark LLP

(57) ABSTRACT

A circulating-type hot-water supply device (1) is provided with a heat exchanger abnormality determining unit (62), which inhibits execution of a suitable temperature maintaining operation when the suitable temperature maintaining operation continued for a predetermined time or more and stops a circulating pump (25), and when a temperature rise range of a detected temperature of a heat exchanger outlet temperature sensor (2) after stopping the circulating pump (25) becomes equal to or more than a temperature rise threshold value determined according to a selected state of burner blocks (3*a*),(3*b*) in a combusted state immediately before stopping the circulating pump (25), determines that a heat exchanger is in an abnormal state.

5 Claims, 4 Drawing Sheets

CIRCULATING-TYPE HOT-WATER SUPPLY DEVICE

BACKGROUND OF THE INVENTION

1. Field of the Invention

The present invention relates to a circulating-type hot-water supply device including a function of maintaining a hot water inside a hot water supply pathway to a suitable temperature, by circulating the hot water inside the hot water supply pathway via a heat exchanger during stopping supply of hot water.

2. Description of the Related Art

Conventionally, in a hot-water supply device which heats water supplied to a water supply path by a heat exchanger heated by a burner, and which supplies hot water to a hot water supply path, a circulating-type hot-water supply device equipped with a communicating path which communicates a vicinity of a downstream end of the hot water supply path and the water supply path, and a circulating pump which circulates water inside a circulating circuit formed from the water supply path, the hot water supply path, and the communicating path via a heat exchanger (for example, refer to Japanese Patent Application Laid-Open No. 2007-263403).

In the circulating-type hot-water supply device mentioned above, the circulating pump is actuated full-time. Further, by heating the water running through the heat exchanger by arbitrarily combusting the burner even during stopping of the supply of hot water, the hot water inside the circulating circuit is maintained to a suitable temperature, and the hot water of the suitable temperature is immediately ejected when a hot water faucet is opened.

In a region with a high hardness of tap water, precipitates (scale) tends to adhere to an inner surface of an endothermic tube in the endothermic tube of the heat exchanger, from $CaCo_3$ or $MgCo_3$ contained in water. When the precipitates adhere as is explained above, a temperature of the heat exchanger rises from degradation of a heat exchange efficiency of the heat exchanger, and deterioration of the heat exchanger may occur originating from the temperature rise.

Therefore, in the circulating-type hot-water supply device mentioned above, when the hot water faucet is closed and the burner is combusting, a flow control valve is closed and the circulation of the hot water inside the circulating circuit is stopped (the burner is extinguished by this stopping), and determines that the heat exchanger is in an abnormal state from adhesion of the precipitates, when a temperature rise range of the hot water in the vicinity of an outlet of the heat exchanger from the time the valve is closed becomes equal to or higher than a predetermined threshold value.

In the circulating-type hot-water supply device mentioned above, the circulating pump is actuated full-time. Therefore, even when the circulation of the hot water inside the circulating circuit is stopped by the flow control valve, the circulating pump is continuing its operation. In this case, there is an inconvenience that the circulating pump runs idle, so that a load of the circulating pump becomes excessive and the circulating pump overheats, so that the circulating pump deteriorates.

The present invention has been made in view of such background, and aims at providing a circulating-type hot-water supply device capable of preventing overheat of a circulating pump, and which could determine that the heat exchanger is in an abnormal state from adhesion of precipitates.

SUMMARY OF THE INVENTION

The present invention has been made in order to achieve the object mentioned above, and provides a circulating-type hot-water supply device, including: a burner; a heat exchanger which is connected to a water supply path and a hot water supply path and heated by a combustion exhaust gas of the burner, and which heats water running therethrough by heat exchange with the combustion exhaust gas of the burner; a communicating path which connects a downstream end of the hot water supply path connected with a hot water faucet and the water supply path; a circulating pump which circulates the water inside a circulating path, which starts from a connecting portion of the hot water supply path and the communicating path, via the communicating path, the water supply path, the heat exchanger, and the hot water supply path, and returns to the connecting portion; a hot water supply temperature sensor which detects a temperature of the water supplied from the hot water supply path to the hot water faucet; a heat exchanger outlet temperature sensor which detects a temperature of the water in a vicinity of an outlet of the heat exchanger; a hot water faucet opening and closing detecting unit which detects opening and closing of the hot water faucet; a hot water supply control unit which executes a hot water supply operation of controlling a combustion amount of the burner, so that the detected temperature by the hot water supply temperature sensor becomes a predetermined target hot water supply temperature, when the hot water faucet is in an opened state; a suitable temperature maintaining control unit which executes a suitable temperature maintaining operation of circulating the water inside the circulating circuit by actuating the circulating pump, and also controlling the combustion amount of the burner so that the detected temperature by the hot water supply temperature sensor becomes within a predetermined suitable temperature range, when the hot water faucet is in the closed state; and a heat exchanger abnormality determining unit which prohibits the execution of the suitable temperature maintaining operation by the suitable temperature maintaining operation unit, stops the circulating pump and also extinguishes the burner, when the suitable temperature maintaining operation is continuing for a predetermined time or more, and when the burner is in the combusting state, and which executes a first abnormality determining process of determining that the heat exchanger is in an abnormal state, when a temperature rise degree of the detected temperature of the heat exchanger outlet temperature sensor after stopping the circulating pump becomes equal to or higher than a predetermined first abnormality determining level (a first aspect of the invention).

According to the first aspect of the invention, when the heat exchanger abnormality determining unit executes the first abnormality determining process and determines the abnormal state of the heat exchanger, the running of the hot water inside the circulating circuit is stopped by stopping the circulating pump. Therefore, it becomes possible to prevent the circulating pump from degrading, from overload such as is in a case of stopping the running of the hot water inside the circulating circuit by closing an opening and closing valve while maintaining the circulating pump to an actuating state.

Further, in the first aspect of the invention, the heat exchanger abnormality determining unit varies the first abnormality determining level, in the first abnormality determining process, according to a combustion amount of the burner immediately before stopping the circulating pump (a second aspect of the invention).

In the second aspect of the invention, a situation of the heat exchange being heated by a combustion exhaust gas of the burner differs, from the combustion amount of the burner. Therefore, a temperature rise degree of the detected temperature of the heat exchanger outlet temperature sensor after the heat exchanger abnormality determining unit stops the circulating pump and extinguishes the burner, changes according to the combustion amount of the burner immediately before stopping the circulating pump.

By changing the abnormality determining level according to the combustion amount of the burner immediately before stopping the circulating pump by the heat exchanger abnormality determining unit, it becomes possible to perform the abnormality determination of the heat exchanger with good accuracy.

Further, in the first aspect of the invention, the burner includes a plurality of burner blocks capable of partitioning a combustion range of the burner, and capable of independently switching combustion and extinction, the hot water supply control unit controls the combustion amount of the burner by varying a selection of the burner block to be combusted, and the heat exchanger abnormality determining unit alters the first abnormality determining level, in the first abnormality determining process, according to a selecting state of the burner block in the combusted state immediately before stopping the circulating pump (a third aspect of the invention).

In the third aspect of the invention, a range of the heat exchanger heated by the combustion exhaust gas of the burner differs, from the selection of the burner block to be combusted. Therefore, the temperature rise degree of the detected temperature of the heat exchanger outlet temperature sensor after the heat exchanger abnormality determining unit stops the circulating pump and extinguishes the burner, changes according to the selection state of the burner block in the combustion state immediately before the circulating pump is stopped.

Therefore, by altering the first abnormality determining level according to a combination of the burner block in the combusted state immediately before the circulating pump is stopped, by the heat exchanger abnormality determining unit, it becomes possible to perform the abnormality determination of the heat exchanger with good accuracy.

Further, in the first aspect of the invention, the burner includes a plurality of burner blocks capable of partitioning a combustion range of the burner, and capable of independently switching combustion and extinction, the hot water supply control unit controls the combustion amount of the burner by varying a selection of the burner block to be combusted, and the heat exchanger abnormality determining unit prohibits the execution of the suitable temperature maintaining operation by the suitable temperature maintaining control unit, when the hot water supply operation is terminated, maintains the circulating pump to a stopped state and also maintains the burner to an extinguished state, and executes a second abnormality determining process of determining that the heat exchanger is in an abnormal state, when a temperature rise degree of the detected temperature by the heat exchanger outlet temperature sensor after terminating the hot water supply operation becomes equal to or more than a second abnormality determining level decided according to a selecting state of the burner block in a combusted state immediately before terminating the hot water supply operation (a fourth aspect of the invention).

According to the fourth aspect of the invention, the second abnormality determining process is executed even when the hot water supply operation is terminated, so as to determine the abnormal state of the heat exchanger. However, the range the heat exchanger is heated by the combustion exhaust gas of the burner differs according to the selection of the burner block to be combusted during the hot water supply operation. Therefore, the temperature rise degree of the detected temperature of the heat exchanger outlet temperature sensor after the hot water supply operation is terminated changes according to the selected state of the burner block in the combusted state immediately before the hot water supply operation is terminated.

Therefore, by deciding the second abnormality determining level in the second abnormality determining process according to the selection state of the burner block in the combusted state immediately before the hot water supply operation is terminated, it becomes possible to determine that the heat exchanger is in the abnormal state with good accuracy.

Further, in any one of the first aspect to the fourth aspect of the invention, the heat exchanger abnormality determining unit discontinues the first abnormality determining process and enables the execution of the hot water supply operation by the hot water supply control unit, when the hot water faucet switches from the closed state to the opened state during execution of the first abnormality determining process (a fifth aspect of the invention).

According to the fifth aspect of the invention, it becomes possible to prevent a state where the hot water is not supplied from the hot water faucet, when a user opens the hot water faucet during execution of the first abnormality determining process, from the execution of the hot water supply operation being interrupted by the continuation of the first abnormality determining process.

DETAILED DESCRIPTION OF THE PREFERRED EMBODIMENTS

Embodiments of the present invention will be explained with reference to FIG. 1 through FIG. 4.

Figure 1:
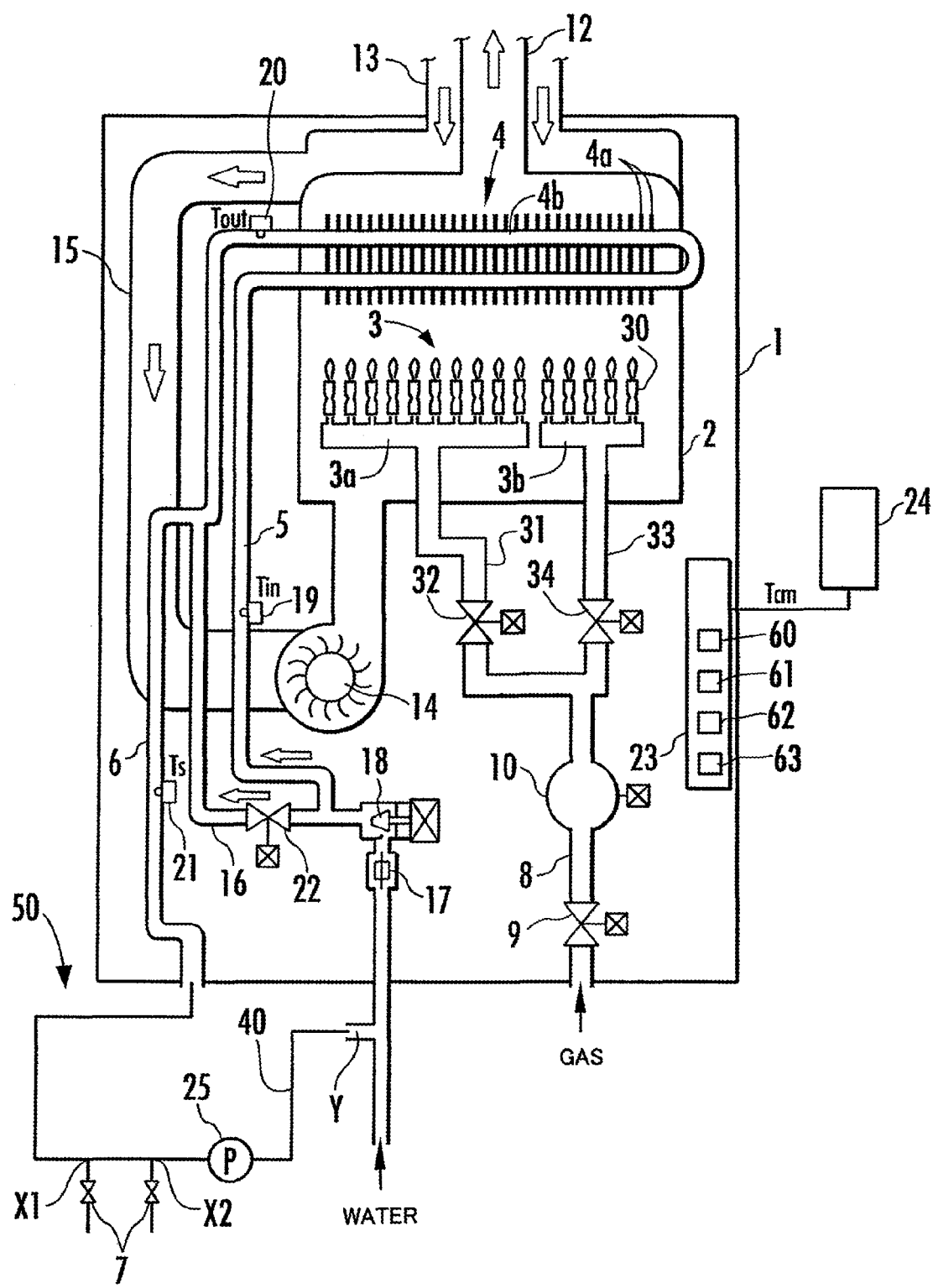
FIG. 1 is a view showing a configuration of a circulating-type hot-water supply device.

With reference to FIG. 1, a circulating-type hot-water supply device 1 of the present invention is equipped with a can body 2 accommodating a burner 3 and a heat exchanger 4 arranged upward of the burner 3, a water supply path 5 connected to an inlet of the heat exchanger 4 (a connecting opening at an upstream side), a hot water supply path 6 connected to an outlet of the heat exchanger 4 (a connecting opening at a downstream side), a gas supply path 8 which supplies a fuel gas to the burner 3, a combustion fan 14 which supplies air for combustion to the burner 3, a communication path 40 which communicates downstream ends X1, X2 connected with a hot water faucet 7 of the hot water supply path 6, with the water supply path 5, a circulating pump 25 which circulates the hot water and the water inside a circulation circuit 50 from a connecting portion of the hot water supply path 6 and the communication path 40 to the connecting portion via the communication path 40, the water supply path 5, the heat exchanger 4, and the hot water supply path 6, a controller 23 which controls overall actuation of the circulating-type hot-water supply device 1, and a remote controller 24 for remotely operating the circulating-type hot-water supply device 1.

The heat exchanger 4 includes a numerous endothermic fins 4a and endothermic pipes 4b penetrating the endothermic fin 4a. Further, water supplied from a waterworks (not shown) to the water supply path 5 is heated by heat exchanging with a combustion exhaust gas of the burner 3 at the heat exchanger 4 and is delivered to the hot water supply path 6, and the hot water is ejected from the hot water faucet 7.

The burner 3 has its combustion range sectioned by a large burner block 3a having ten unit burners 30, and a small burner block 3b having five unit burners 30, and is configured so as to be capable of independently switching the combustion and extinction of each burner block 3a, 3b.

Specifically, the combustion range of the burner 3 is switched to three stages, namely, a large power (the large burner block 3a: combusted, the small burner block 3b: combusted), a medium power (the large burner block 3a: combusted, the small burner block 3b: extinguished) and a small power (the large burner block 3a: extinguished, the small burner block 3b: combusted).

The gas supply path 8 is provided with a gas main valve 9 and a gas proportional valve 10 from the upstream side. Further, to a large burner branch path 31 which branches from the gas supply path 8, a large burner changeover valve 32 is provided, and to a small burner branch path 33 which branches from the gas supply path 8, a small burner switchover valve 34 is provided. A combustion amount of the burner 3 is controlled by changing opening and closing of the large burner changeover valve 32 and the small burner changeover valve 34, and by adjusting an opening degree of the gas proportional valve 10.

The combustion exhaust gas of the burner 3 is ejected to outdoors via an exhaust pipe 12 from an upper end portion of the can body 2, after exchanging heat at the heat exchanger 4. The exhaust pipe 12 is covered by an air supply pipe 13, and the air supply pipe 13 is connected to a suction duct 15 which communicates with an air inlet of the combustion fan 14. With the actuation of the combustion fan 14, external air is supplied as the air for combustion into the can body 2, via the air supply pipe 13, the suction duct 15, and the combustion fan 14.

The water supply path 5 and the hot water supply path 6 are connected by a bypass path 16 which bypasses the heat exchanger 4. To an upstream side of the water supply path 5 from a connecting portion with the bypass path 16, a flow rate sensor 17 which detects a flow rate of the hot water and the water flowing the water supply path 5, and a flow control valve 18 which changes the opening degree of the water supply path 5, are provided. Further, to a downstream side of the water supply path 5 from the connecting portion with the bypass path 16, a supply water temperature sensor 19 which detects a temperature of water supplied to the heat exchanger 4 is provided.

To an upstream side of the hot water supply path 6 from a connecting portion with the bypass path 16, a heat exchanger outlet temperature sensor 20 which detects a temperature of the hot water near an outlet of the heat exchanger 4 is provided. Further, to a downstream side of the hot water supply path 6 from the connecting portion with the bypass path 16, a hot water supply temperature sensor 21 which detects a temperature of a hot water supplied from the hot water supply path 6 to the hot water faucet 7 is provided.

The bypass path 16 is provided with a bypass flow control valve 22 which changes an opening degree of the bypass path 16 so as to adjust a proportion (a bypass ratio) of a flow rate of the hot water and the water flowing to the bypass path 16 side with respect to a flow rate of the hot water and the water flowing to the heat exchanger 4.

The controller 23 is an electronic circuit unit configured from CPU, memory and the like, that are not shown, and detection signals from each of the flow rate sensor 17, the supply water temperature sensor 19, the heat exchanger outlet temperature sensor 20, and the hot water supply temperature sensor 21 are input to the controller 23.

Further, by a control signal output from the controller 23, actuations of the gas main valve 9, the gas proportional valve 10, the large burner changeover valve 32, the small burner changeover valve 34, the combustion fan 14, the flow control valve 18, the bypass flow control valve 22, and the circulating pump 25 are controlled. Further, to the controller 23, the remote controller 24 for remotely operating the circulating-type hot-water supply device 1 is connected.

The controller 23 functions as a hot water supply control unit 60, a suitable temperature maintaining control unit 61, a heat exchanger abnormality determining unit 62, and a hot water faucet open/close detecting unit 63, by executing control program of the circulating-type hot-water supply device 1 stored in a memory with a CPU.

The hot water supply control unit 60 ignites the burner 3, when the hot water faucet 7 becomes an opened state, and a detected flow rate by the flow rate sensor 17 becomes equal to or higher than a minimum operation flow rate by a water supply from the waterworks to the water supply path 5.

Thereafter, the hot water supply control unit 60 performs a hot water supply operation of adjusting the combustion amount of the burner 3 by controlling the actuation of the combustion fan 14, the gas proportional valve 10, the large burner changeover valve 32, and the small burner changeover valve 34, and also of adjusting the opening degree of the bypass flow control valve 22, so that a detected temperature Ts by the hot water supply temperature sensor 21 coincides with a target hot water supply temperature set by the remote controller 24.

Further, when the detected temperature Ts by the hot water supply temperature sensor 21 does not reach the target hot water supply temperature even when the combustion amount of the burner 3 is made maximum, the hot water supply control unit 60 decreases a passing water flow rate of the water supply path 5 by the flow control valve 18. The hot water supply control unit 60 maintains the circulating pump 25 to a stopped state during execution of the hot water supply operation, and thereby reduces a power consumption of the circulating pump 25.

When the hot water faucet 7 is in a closed state and the water supply to the water supply path 5 from the waterworks is stopped, the suitable temperature maintaining control unit 61 actuates the circulating pump 25 so as to circulate the hot water and the water inside the circulation circuit 50, and also executes a suitable temperature maintaining operation of heating the heat exchanger 4 by the burner 3.

In the suitable temperature maintaining operation, the suitable temperature maintaining control unit 61 makes the burner 3 combust and heat the hot water and the water circulating inside the circulation circuit 50, so that the detected temperature by the hot water supply temperature sensor 21 becomes within a suitable temperature range set according to the target hot water supply temperature Tcm.

By the execution of the suitable temperature maintaining operation, the temperature of hot water inside the circulation circuit 50 is maintained in a vicinity of the target hot water supply temperature, and the hot water with suitable temperature is immediately supplied from the hot water faucet 7 when a user opens the hot water faucet 7, so that it becomes possible to avoid providing uncomfortable feeling to the user from cool water flowing out when the hot water faucet 7 is opened.

The suitable temperature range in the suitable temperature maintaining operation may not be set according to the target hot water supply temperature set by the remote controller 24, and may be a fixed value of a level in which the user does not feel coldness.

The heat exchanger abnormality determining unit 62 determines that the heat exchanger 4 is in an abnormal state in which precipitates adhere to an inner surface of the endothermic pipe 4b. Details of the determination process will be explained later.

The hot water faucet open/close detecting unit 63 detects an opened/closed state of the hot water faucet 7. When the hot water faucet 7 is in the closed state, then the suitable temperature maintaining operation is executed by the suitable temperature maintaining control unit 61, and the temperature of the hot water inside the circulation circuit 50 is maintained in the vicinity of the target hot water supply temperature Tcm.

Therefore, the detected temperature Tin by the supply water temperature sensor 19 becomes equal to or more than a predetermined temperature YTin (which is set to a temperature slightly lower than the target hot water supply temperature Tcm). Therefore, the hot water faucet open/close detecting unit 63 detects that the hot water faucet 7 is in the closed state, when the detected temperature Tin by the supply water temperature sensor 19 is equal to or higher than the predetermined temperature YTin.

On the other hand, when the hot water faucet 7 is in the opened state, the water is supplied from the waterworks to the water supply path 5, so that the detected temperature Tin by the supply water temperature sensor 19 becomes the temperature of the water from the waterworks, and becomes lower than YTin. Therefore, the hot water faucet open/close detecting unit 63 detects that the hot water faucet 7 is in the opened state, when the detected temperature Tin by the supply water temperature sensor 19 is lower than YTin.

[First Abnormality Determining Process]

Next, an execution procedure of the suitable temperature maintaining operation by the suitable temperature maintaining control unit 61, and a first abnormality determining process for determining the abnormal state of the heat exchanger 4 by the heat exchanger abnormality determining unit 62 will be explained, following a flowchart shown in FIG. 2.

STEP 1 through STEP 3 and STEP 20 are process by the suitable temperature maintaining control unit 61. The suitable temperature maintaining control unit 61 determines whether or not the supply of hot water from the hot water faucet 7 is stopped, in STEP 1. When the suitable temperature maintaining operation had already been started, the suitable temperature maintaining control unit 61 determines that the supply of hot water is stopped, when the closure of the hot water faucet 7 is detected by the hot water faucet open/close detecting unit 63.

Further, when the suitable temperature maintaining operation has not been started yet, the suitable temperature maintaining control unit 61 determines that the supply of hot water is stopped, when the detected flow rate of the flow rate sensor 17 is less than the predetermined minimum actuation flow rate.

Thereafter, when the supply of hot water from the hot water faucet 7 is stopped, the process proceeds to STEP 2, and determines whether or not a setting of a suitable temperature maintaining request is made by the remote controller 24. On the other hand, when the supply of hot water from the hot water faucet 7 is not stopped, the process branches to STEP 20, and the suitable temperature maintaining control unit 61 stops the suitable temperature maintaining operation and returns to STEP 1.

In STEP 2, the suitable temperature maintaining control unit 61 determines whether or not the setting of the suitable temperature maintaining request is made by the remote controller 24. When the setting of the suitable temperature maintaining request is made, the process proceeds to STEP 3, and the suitable temperature maintaining control unit 61 executes the suitable temperature maintaining operation.

In the suitable temperature maintaining operation, as is explained above, the suitable temperature maintaining control unit 61 actuates the circulating pump 25 and circulates the water in the circulation circuit 50, and also controls the combustion amount of the burner 3, so that the detected temperature Ts by the hot water supply temperature sensor 21 becomes within the suitable temperature range. On the other hand, when the setting of the suitable temperature maintaining request is not made, the process branches to STEP 20.

Subsequent STEP 4 through STEP 12 and STEP 30 are process by the heat exchanger abnormality determining unit 62. In STEP 4, the heat exchanger abnormality determining unit 62 determines whether or not a condition that the suitable temperature maintaining operation is continuing for one hour (corresponds to a predetermined time of the present invention) or more, and the burner 3 is in a combusting state, is satisfied. When the condition is satisfied, the process proceeds to STEP 5, and when the condition is not satisfied, the process returns to STEP 1.

In STEP 5, the heat exchanger abnormality determining unit 62 prohibits the suitable temperature maintaining operation by the suitable temperature maintaining control unit 61, stops the actuation of the circulating pump 25, and also extinguishes the burner 3. In subsequent STEP 6, the heat exchanger abnormality determining unit 62 performs a "check indication" indicating that the determination on the abnormal state of the heat exchanger 4 is being performed, in an indicating unit (not shown) of the remote controller 24.

In subsequent STEP 7, the heat exchanger abnormality determining unit 62 reads a temperature rise threshold value YΔTout (corresponds to a first abnormality determining level of the present invention) corresponding to a power stage (the large power, the medium power, and the small power) of the burner 3 immediately before stopping the circulating pump 25 in STEP 5, from a memory.

Figure 3A:
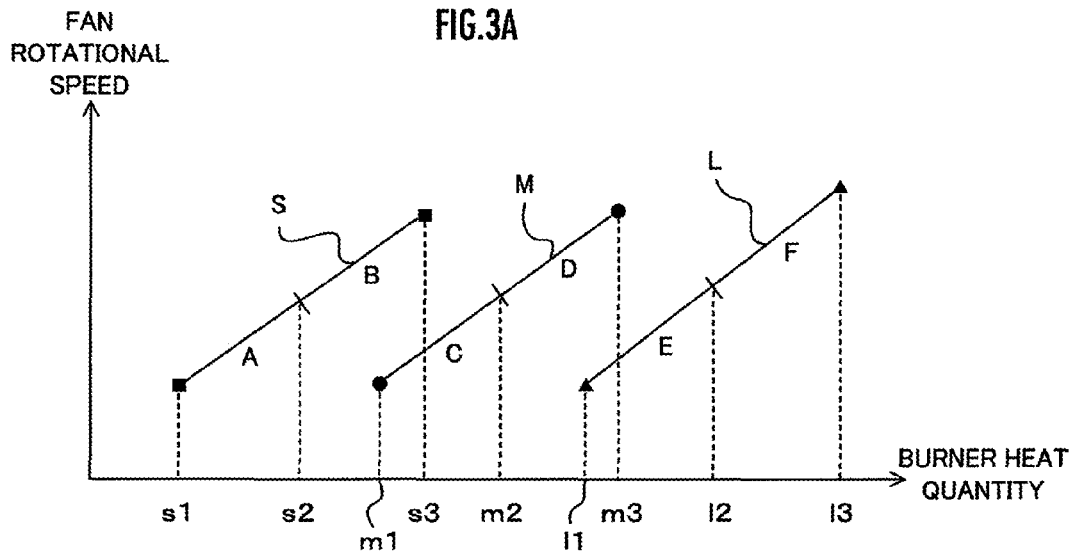
FIG. 3A is an explanatory view of a variation range of a combustion amount of a burner by selection of a burner block to be combusted.

FIG. 3A shows a variation range of the heat quantity of the burner 3 in each power stage, taking a rotational speed of the combustion fan 14 as an axis of ordinate, and the heat quantity of the burner 3 as an axis of abscissas, indicating the large power as L, the medium power as M, and the small power as S.

The small power S covers a range of s1 (a minimum heat quantity) through s3 (a maximum heat quantity), and the medium heat quantity is s2. In FIG. 3A, a range of s1 through s2 is indicated by A, and a range of s2 through s3 is indicated by B. The medium power M covers a range of m1 (the minimum heat quantity) through m3 (the maximum heat quantity), and the medium heat quantity is m2.

In FIG. 3A, a range of m1 through m2 is indicated by C, and a range of m2 through m3 is indicated by D. The large power L covers a range of l1 (the minimum heat quantity) through l3 (the maximum heat quantity), and the medium heat quantity is l2. In FIG. 3A, a range of l1 through l2 is indicated by E, and a range of l2 through l3 is indicated by F.

In a case of switching the power of the burner 3 by selecting the burner block to be combusted (the large burner block 3a, the small burner block 3b) as is explained above, the range of the heat exchanger 3 to be heated by the combustion exhaust gas of the burner 3 changes, since the combustion range of the burner 3 differs in each power.

Therefore, a temperature rise range in the detected temperature of the heat exchanger outlet temperature sensor 20 after stopping the combustion of the burner 3 has a tendency of increasing as the combustion range becomes broader from the small power to the medium power to the large power. However, this tendency differs in each power, so that the same cannot be expressed in one straight line.

Figure 3B:
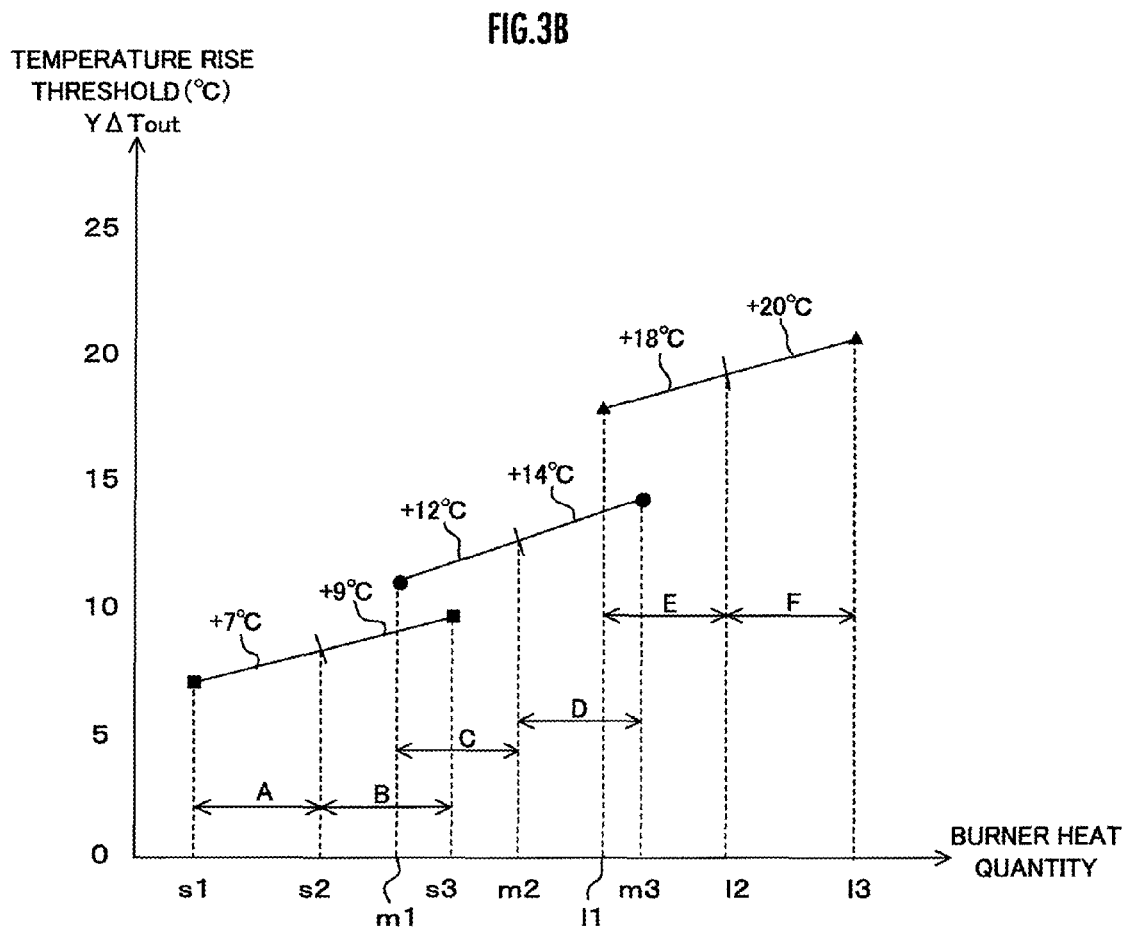
FIG. 3B is an explanatory view of an abnormality determination threshold value.

Therefore, in the present embodiment, as is shown in FIG. 3B, the temperature rise threshold value YΔTout is set for each power stage. That is, it is set to 7° C. in the range of A (s1 to s2) of the small power (a small heat quantity side), and is set to 9° C. in the range of B (s2 to s3) (a large heat quantity side). Further, it is set to 12° C. in the range of C (m1 to m2) of the medium power (the small heat quantity side), and is set to 14° C. in the range of D (m2 to m3) (the large heat quantity side). Further, it is set to 18° C. in the range of E (l1 to l2) of the large power (the small heat quantity side), and is set to 20° C. in the range of F (l2 to l3) (the large heat quantity side).

In the memory of the controller 23, a data mapping the setting of FIG. 3B as is shown in Table 1 below, is stored.

TABLE 1

[Setting of temperature rise threshold value YΔTout]

| | power stage | | | | | |
|---|---|---|---|---|---|---|
| | small power | | medium power | | large power | |
| heat quantity | small side A | large side B | small side C | large side D | small side E | large side F |
| YΔTout | 7° C. | 9° C. | 12° C. | 14° C. | 18° C. | 20° C. |

The heat exchanger abnormality determining unit 62 applies the power stage (the small power/the medium power/the large power) of the burner 3 immediately before stopping the circulating pump 25 in STEP 5, and the range (the small side/the large side) the heat quantity belongs in each power stage, to the table of Table 1, and reads the temperature rise threshold value YΔTout to be used.

Thereafter, the heat exchanger abnormality determining unit 62 starts a check timer (for example, a timer is set to 1 to 2 minutes) in STEP 8, and determines, in a loop of subsequent STEP 9 through STEP 11, whether or not the temperature rise range ΔTout of the detected temperature Tout by the heat exchanger outlet temperature sensor 20 measured in STEP 9 becomes equal to or higher than the temperature rise threshold value YΔTout in STEP 10, before the check timer runs out in STEP 11.

Thereafter, in STEP 10, when the temperature rise range ΔTout of the detected temperature Tout by the heat exchanger outlet temperature sensor 20 becomes equal to or higher than the temperature rise threshold value YΔTout, it could be determined that a heat exchange efficiency of the heat exchanger 4 dropped from adhesion of the precipitates to the inner side of the endothermic pipe 4b of the heat exchanger 4, and the temperature rise range ΔTout of the detected temperature Tout by the heat exchanger outlet temperature sensor 20 became larger from a heat rise after extinction, after stopping passing of water.

Therefore, in this case, the process branches to STEP 30, and the heat exchanger abnormality determining unit 62 notifies that the heat exchanger 4 is in the abnormal state, by performing an indication indicating the abnormality of the heat exchanger 4 (for example, indication of an error code and the like), to the indicating unit of the remote controller 24.

On the other hand, when the check timer runs out in STEP 11, it could be determined that the temperature rise range ΔTout of the detected temperature Tout by the heat exchanger outlet temperature sensor 20 from the heat rise after extinction, after stopping passing of water, is low, and the adhesion of the precipitates to the inner side of the endothermic pipe 4b of the heat exchanger 4 is not in an abnormal level.

Therefore, in this case, the process proceeds to STEP 12, and the heat exchanger abnormality determining unit 62 terminates the check indication. Thereafter, the process proceeds to STEP 13, and the heat exchanger abnormality determining unit 62 terminates the first abnormality determining process.

[Second Abnormality Determining Process]

Figure 4:
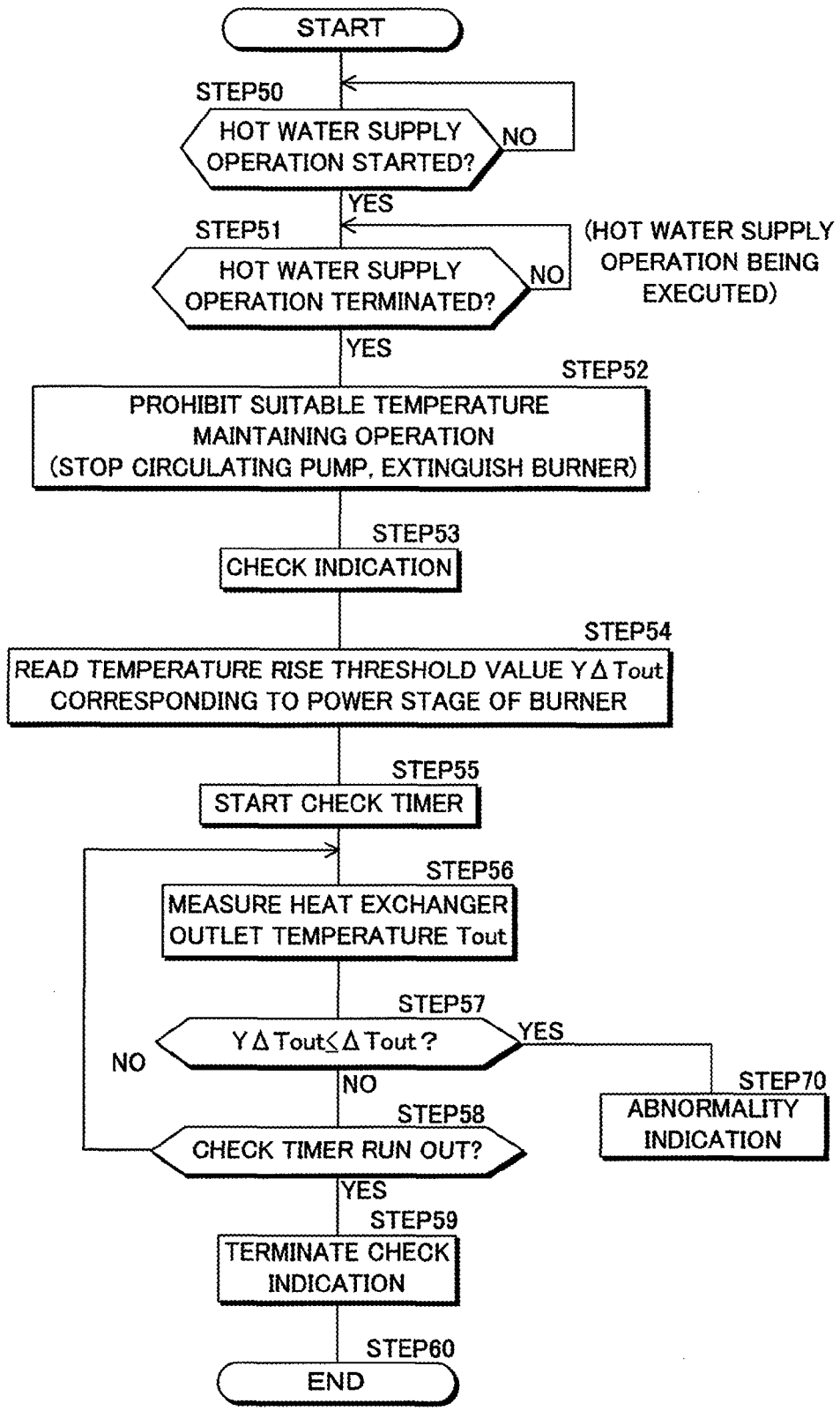
FIG. 4 is a flow chart of a second abnormality determining process.

Next, an execution procedure of a second abnormality determining process for determining an abnormal state of the heat exchanger 4 by the heat exchanger abnormality determining unit 62 will be explained, following a flowchart shown in FIG. 4.

In STEP 50, the heat exchanger abnormality determining unit 62 waits for the start of the hot water supply operation by the hot water supply control unit 60, and proceeds to STEP 51. Thereafter, the heat exchanger abnormality determining unit 62 waits for the termination of execution of the hot water supply operation by the hot water supply control unit 60 in STEP 51, and proceeds to STEP 52.

In STEP 52, the heat exchanger abnormality determining unit 62 prohibits the suitable temperature maintaining operation by the suitable temperature maintaining control unit 61, maintains the circulating pump 25 to the stopped state, and also maintains the burner 3 to the extinguished state. In subsequent STEP 53, the heat exchanger abnormality determining unit 62 performs the "check indication" indicating that the determination of the abnormal state of the heat exchanger 4 is being performed, in the indicating unit of the remote controller 24.

Next, in STEP 54, the heat exchanger abnormality determining unit 62 reads the temperature rise threshold value YΔTout (corresponds to a second abnormality determining level of the present invention) to be used, by applying the power stage (the small power/the medium power/the large power) of the burner 3 immediately before terminating the hot water supply operation in STEP 51, and the range the heat quantity belongs in each power stage (the small side/the large side), to the table of the above-mentioned table 1.

In the present embodiment, the temperature rise threshold value YΔTout to be used in the first heat exchanger abnormality determining process and the temperature rise threshold value YΔTout to be used in the second heat exchanger abnormality determining process are decided by the same condition from the table in the above-mentioned table 1. However, they may be set from different conditions.

In subsequent STEP 55, the heat exchanger abnormality determining unit 62 starts the check timer (for example, the timer is set to one to two minutes). By the subsequent loop of STEP 56 through STEP 58, the heat exchanger abnormality determining unit 62 determines whether or not the temperature rise range ΔTout of the detected temperature Tout by the heat exchanger outlet temperature sensor 20 measured in STEP 56 becomes equal to or higher than the temperature rise threshold value YΔTout in STEP 57, before the check timer runs out in STEP 58.

Thereafter, in STEP 57, when the temperature rise range ΔTout of the detected temperature Tout by the heat exchanger outlet temperature sensor 20 becomes equal to or higher than the temperature rise threshold value YΔTout, it can be determined that the heat exchange efficiency of the heat exchanger 4 dropped from adhesion of the precipitates to the inner side of the exothermic tube 4b of the heat exchanger 4, and that the temperature rise range ΔTout of the detected temperature of the heat exchanger outlet temperature sensor 20 became larger from the heating after extinction, after stopping flowing of the water.

Figure 2:
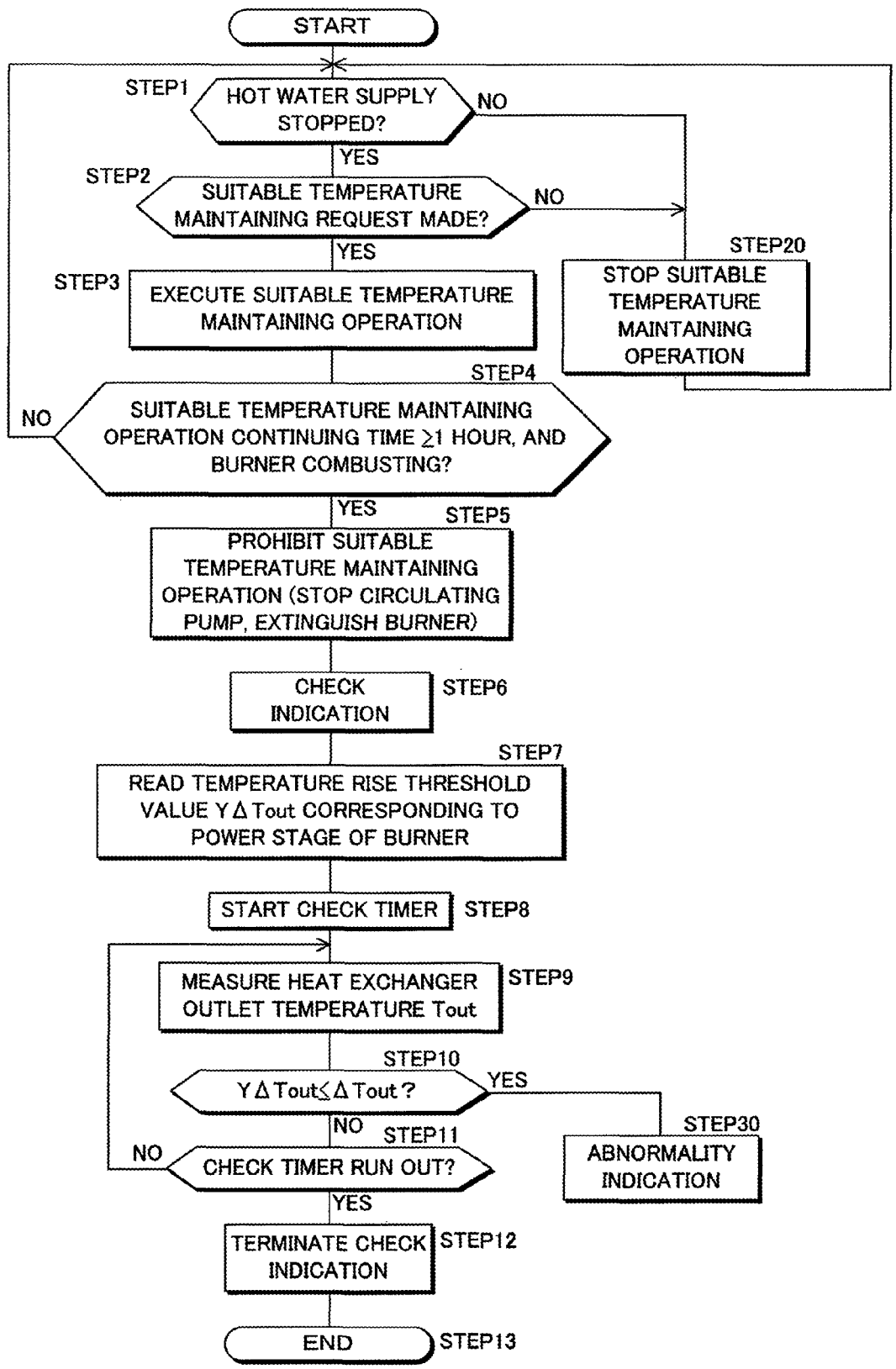
FIG. 2 is a flow chart of a first abnormality determining process.

Therefore, in this case, the process branches to STEP 70, and the heat exchanger abnormality determining unit 62 notifies that the heat exchanger 4 is in the abnormal state, by performing the display of indicating the abnormality of the heat exchanger 4 to the indicating unit of the remote controller 24, similarly to STEP 30 of FIG. 2 explained above.

On the other hand, when the check timer runs out in STEP 58, it can be determined that the temperature rise range ΔTout of the detected temperature Tout by the heat exchanger outlet temperature sensor 20 from the heating after extinction, after stopping flowing of the water, is small, and the adhesion of the precipitates to the inner side of the exothermic pipe 4b of the heat exchanger 4 is not in the abnormal level.

Therefore, in this case, the process proceeds to STEP 59, and the heat exchanger abnormality determining unit 62 terminates the check indication. Thereafter, the process proceeds to STEP 60, and the heat exchanger abnormality determining unit 62 terminates the second abnormality determining process.

In the present embodiment, the temperature rise range of the detected temperature is used as a rising degree of the detected temperature of the heat exchanger outlet temperature sensor. However, a rising rate of the detected temperature may be used.

Further, in the present embodiment, the heat exchanger abnormality determining unit 62 determined that the heat exchanger 4 is in the abnormal state, by executing the first abnormality detecting process and the second abnormality detecting process. However, the effect of the present invention may be obtained, by determining that the heat exchanger 4 is in the abnormal state by executing at least the first abnormal determining process.

Further, in the present embodiment, the heat exchanger abnormality determining unit 62 indicates the burner 3 configured from a plurality of burner blocks 3a, 3b, and altered the temperature rise threshold value YΔTout according to the power stage of the burner 3. However, the effect of the present invention may be obtained even in the case such alteration is not performed.

Further, in the present embodiment, the burner 3 configured from a plurality of the burner blocks 3a, 3b, and which changes the combustion amount by selecting the burner block to be combusted is indicated. However, a burner which does not perform change of the combustion amount by selecting the burner block to be combusted may be used. In this case, the temperature rise threshold value YΔTout used in the first abnormality determining process may be changed according to the combustion amount of the burner immediately before stopping combustion (for example, setting the temperature rise threshold value YΔTout to be higher, as the combustion amount of the burner immediately before stopping combustion is larger).

Further, when the hot water faucet 7 is switched from the closed state to the opened state during the execution of the first abnormality determining process by the heat exchanger abnormality determining unit 62, the first abnormality determining process may be stopped and the execution of the hot water supply operation by the hot water supply control unit 60 may be made possible.

What is claimed is:

1. A circulating-type hot-water supply device, comprising:
a burner;
a heat exchanger which is connected to a water supply path and a hot water supply path and heated by a combustion exhaust gas of the burner, and which heats water running therethrough by heat exchange with the combustion exhaust gas of the burner;
a communicating path which connects a downstream end of the hot water supply path connected with a hot water faucet and the water supply path;
a circulating pump which circulates the water inside a circulating path, which starts from a connecting portion of the hot water supply path and the communicating path, via the communicating path, the water supply path, the heat exchanger, and the hot water supply path, and returns to the connecting portion;
a hot water supply temperature sensor which detects a temperature of the water supplied from the hot water supply path to the hot water faucet;
a heat exchanger outlet temperature sensor which detects a temperature of the water in a vicinity of an outlet of the heat exchanger;
a hot water faucet opening and closing detecting unit which detects opening and closing of the hot water faucet;
a hot water supply control unit which executes a hot water supply operation of controlling a combustion amount of the burner, so that the detected temperature by the hot water supply temperature sensor becomes a predetermined target hot water supply temperature, when the hot water faucet is in an opened state;
a suitable temperature maintaining control unit which executes a suitable temperature maintaining operation of circulating the water inside the circulating circuit by actuating the circulating pump, and also controlling the combustion amount of the burner so that the detected temperature by the hot water supply temperature sensor becomes within a predetermined suitable temperature range, when the hot water faucet is in a closed state; and
a heat exchanger abnormality determining unit which prohibits the execution of the suitable temperature maintaining operation by the suitable temperature maintaining operation unit, stops the circulating pump and also extinguishes the burner, when the suitable temperature maintaining operation is continuing for a predetermined time or more, and when the burner is in the combusting state, and which executes a first abnormality determining process of determining that the heat exchanger is in an abnormal state, when a temperature rise degree of the detected temperature of the heat exchanger outlet temperature sensor after stopping the circulating pump becomes equal to or higher than a predetermined first abnormality determining level.

2. The circulating-type hot-water supply device according to claim 1,
wherein the heat exchanger abnormality determining unit varies the first abnormality determining level, in the first abnormality determining process, according to a combustion amount of the burner immediately before stopping the circulating pump.

3. The circulating-type hot-water supply device according to claim 1,
wherein the burner includes a plurality of burner blocks capable of partitioning a combustion range of the burner, and capable of independently switching combustion and extinction, the hot water supply control unit controls the combustion amount of the burner by varying a selection of the burner block to be combusted, and the heat exchanger abnormality determining unit alters the first abnormality determining level, in the first abnormality determining process, according to a selecting state of the burner block in the combusted state immediately before stopping the circulating pump.

4. The circulating-type hot-water supply device according to claim 1, wherein the burner includes a plurality of burner blocks capable of partitioning a combustion range of the burner, and capable of independently switching combustion and extinction, the hot water supply control unit controls the combustion amount of the burner by varying a selection of the burner block to be combusted, and the heat exchanger abnormality determining unit prohibits the execution of the suitable temperature maintaining operation by the suitable temperature maintaining control unit, when the hot water supply operation is terminated, maintains the circulating pump to a stopped state and also maintains the burner to an extinguished state, and executes a second abnormality determining process of determining that the heat exchanger is in an abnormal state, when a temperature rise degree of the detected temperature by the heat exchanger outlet temperature sensor after terminating the hot water supply operation becomes equal to or more than a second abnormality determining level decided according to a selecting state of the burner block in a combusted state immediately before terminating the hot water supply operation.

5. The circulating-type hot-water supply device according to claim 1, wherein the heat exchanger abnormality determining unit discontinues the first abnormality determining process and enables the execution of the hot water supply operation by the hot water supply control unit, when the hot water faucet switches from a closed state to an opened state during execution of the first abnormality determining process.

* * * * *